(12) United States Patent
Smith (10) Patent No.: US 7,431,056 B1
(45) Date of Patent: Oct. 7, 2008

(54) FUNNEL STORAGE APPARATUS

(76) Inventor: Nicholas P. Smith, 10433 Denali Ridge Ct., Las Vegas, NV (US) 89129

( * ) Notice: Subject to any disclaimer, the term of this patent is extended or adjusted under 35 U.S.C. 154(b) by 101 days.

(21) Appl. No.: 11/582,183

(22) Filed: Oct. 17, 2006

(51) Int. Cl.
*B65B 3/04* (2006.01)
*B65B 39/00* (2006.01)
*B65D 85/20* (2006.01)

(52) U.S. Cl. .................... 141/86; 141/1; 141/100; 141/338; 206/349; 206/372; 248/94

(58) Field of Classification Search ............ 141/100, 141/331–332, 340, 375, 86, 234, 338, 1, 141/9; 206/216, 223, 372, 349; 248/94
See application file for complete search history.

(56) References Cited

U.S. PATENT DOCUMENTS

| | | | | |
|---|---|---|---|---|
| 3,654,969 A | * | 4/1972 | Vazquez et al. | 141/106 |
| 3,752,222 A | | 8/1973 | Bush | |
| 3,955,682 A | | 5/1976 | Baren | |
| 4,789,017 A | | 12/1988 | Panasewicz et al. | |
| 4,832,095 A | * | 5/1989 | Bonnell | 141/106 |
| 5,350,065 A | * | 9/1994 | Darrey | 206/373 |
| 5,386,922 A | * | 2/1995 | Jordan | 206/373 |
| D375,874 S | | 11/1996 | Chrisco | |
| 5,607,004 A | | 3/1997 | Cope | |
| 5,924,568 A | * | 7/1999 | Zajonc | 206/373 |
| 5,938,049 A | * | 8/1999 | Susholz | 224/915 |
| 6,305,557 B1 | | 10/2001 | Brooks | |
| 6,558,222 B1 | | 5/2003 | Maddock | |
| 6,763,861 B2 | | 7/2004 | Saks, III | |

* cited by examiner

*Primary Examiner*—Timothy L Maust
*Assistant Examiner*—Nicolas A Arnett
(74) *Attorney, Agent, or Firm*—Robert C. Montgomery (57) ABSTRACT

The invention as presently conceived discloses a device for an environmentally safe storage and organization of multiple funnels, especially, but not limited to, those funnels conventionally used in servicing motor vehicles. The new and novel device's industrial design resembles an empty five-gallon bucket with a detachable lid having multiple openings cut into the lid to accept the work funnels for environmental safe draining in an upright position, storage and proper organization. Each opening leads to a dedicated fluid collection device. After use, the remaining fluids in the funnels are allowed to collect via gravity within fluid collection device within the sealed bucket-like container.

10 Claims, 10 Drawing Sheets

FUNNEL STORAGE APPARATUS

RELATED APPLICATIONS

The present invention was first described in Disclosure Document No. 590,458 filed on Dec. 8, 2005.

FIELD OF THE INVENTION

This invention relates to portable storage and collection bins and, more particularly, to a funnel storage apparatus for simultaneously supporting a plurality of funnels while collecting fluids drained therefrom.

BACKGROUND OF THE INVENTION

Modern motor vehicles are a true engineering marvel. Their long-run time between major maintenance is in stark contrast to engines of even a few decades ago, which required constant adjustment and maintenance to keep them operational. While tune-ups and major repair of such modern marvels are rare, they still do require frequent monitoring and topping off of fluid levels such as oil, antifreeze, brake fluid, transmission fluid, windshield wiper fluid and the like. Most shops and garages have separate funnels for use with such fluids to prevent cross contamination, but they are still faced with the dilemma of what to do with the funnels between uses. If the funnels are left on a bench, they will roll around and make a mess. Should they be wiped out with a rag, then a soiled rag must be dealt with, as well as the time it takes to complete the wiping process. Finally, they can be set back into the open container they were used with, but such a solution leaves the container open to contamination as well as possibly allowing the funnel and container to tip over and make an even bigger mess. Accordingly, there exists a need for a means by which funnels that have been recently used, can be stored and controlled without the disadvantages as described above. The development of the present invention fulfills this need.

Several attempts have been made in the past to develop a funnel storage apparatus for simultaneously supporting a plurality of funnels while collecting fluids drained therefrom. U.S. Pat. No. 6,305,557 in the name of Brooks discloses a funnel-shaped holder for holding an implement and it's method of use. The holder includes a funnel structure having an upper end that flares open upwardly and is relatively wide for receiving an implement, a lower end that opens downwardly and is relatively narrow, and a rear wall with a substantially flat vertical inside surface. Opposite converging side walls define, in conjunction with the rear wall, a funnel-shaped recess. A front wall prevents the implement from falling forward out of the recess, and an opening in the front wall allows the implement to be inserted into the funnel-shaped recess and removably held captive in a stored position. A wall-mounted system for holding implements includes a plurality of funnel-shaped holders mountable on a panel support and at least one horizontal track on the panel support to permit the funnel structure to be slidably moved along the track to a selected horizontal position relative to the panel support. Unfortunately, this example does not provide a means of collecting and storing fluids that are introduced into the funnel.

U.S. Pat. No. 6,763,861 in the name of Saks, III discloses a rack system for supporting devices such as funnels and small fluid containers used to drain residual fluid after use. Residual fluid drains into a pan shaped collection device that may be filled with a layer of fluid absorbent material. Drain pans can be positioned on the system for draining residual fluid into the collection device. Unfortunately, this example provides only a small, uncovered pan for the collection of drained fluids, thus presenting a risk of spillage of the fluid, as well as the ability to hold a very limited amount of fluid therein.

U.S. Pat. No. 5,607,004 in the name of Cope describes a self-supporting funnel assembly and drip catcher for selective use in applications in which a user desires to free both the user's hands from holding the funnel in position and desires to prevent spillage of the funneled fluid during and after use. The funnel is made up of a wider conical portion, the mouth of the funnel, and a narrower portion, the spout of the funnel; a base housing defining several openings; generally "L"-shaped clamping members, each having a vertical component projecting below the base housing and a horizontal component; and a springing mechanism, operably connected to each clamping member and the base housing. Unfortunately, this example does not allow for multiple funnels to be used at the same time, nor does it provide a means of collecting and storing drained fluid.

U.S. Pat. No. 4,789,017 in the name of Panasewicz, et al discloses a liquid transfer system including a funnel with a dust cover that may be stored on a funnel support while the funnel is in use and that may include a piercing tool on its inner surface capable of puncturing the lids of containers used with the funnel. Also claimed is such a liquid transfer system including a support that holds the funnel in a vertical position during storage, a drip catcher, and an axially extendible and compressible spout. Unfortunately, this example does not allow for multiple funnels to be used at the same time, and is very limited in the amount of fluid collected and stored therein.

None of the prior art particularly describes an apparatus that provides a portable storage and collection apparatus for easily holding a plurality of funnel and collecting residual fluids dripping therefrom. Accordingly, there is a need for a funnel storage apparatus for simultaneously supporting a plurality of funnels while collecting fluids drained therefrom. Such an invention includes a lid that fits upon a standard five-gallon bucket. A series of five holes, approximately 1½ to 2 inches, are placed in the lid. Such holes are located at the center and the 12, 3, 6 & 9 o'clock positions. The holes are then used to store various sized funnels in their upright position. As the oil, water, fluid, or the like drips from the funnel, it is collected in the bucket. When the fluids accumulate in the bottom of the bucket, the bucket is drained in an environmentally responsive manner. The funnel storage apparatus provides users with the ability the store used funnels in a manner which not only prevents a mess and keeps them handy, but is environmentally responsible as well.

SUMMARY OF THE INVENTION

In view of the foregoing disadvantages inherent in the prior art, it has been observed that there is need for a funnel storage apparatus for simultaneously supporting a plurality of funnels while collecting fluids drained therefrom.

The apparatus includes a bucket that has an upper opening, and a lid designed in such a manner to operably receive a plurality of funnels therein. Such a lid includes an inner wall that has an extruding member extending perpendicular therefrom to adaptably and correspondingly match an outer wall of the bucket. The lid further includes a threaded inside wall defining a bore for correspondingly receiving an outer wall of the bucket. Such an outer wall has a threaded region positioned at an upper opening thereof, which is crucial for receiving and cooperating with the inside wall of the lid in such a manner that the lid is securely positioned over the upper opening.

The lid is removably attached to the bucket and is provided with a plurality of coextensively shaped apertures punctured therein, which is essential for collectively receiving the funnels and advantageously maintaining the funnels at substantially stable positions during storage. Such apertures are octagonally shaped, which is important to stably hold a variety of the funnels in an arrangement where the funnels are easily removable from the lid. Each of the octagonal apertures is conveniently provided with a plastic ring embedded around a periphery thereof respectively. Such rings have substantially similar shapes as the apertures respectively.

The apparatus further includes a plurality of isolated collection bins for effectively receiving and collecting residual fluid dripping from the funnels. Such collection bins are removably seated within the bucket and are positioned underneath desired ones of the apertures, which is essential for operably receiving the residual fluids from the funnels. One of such collection bins has a receiving aperture centrally registered with the bucket. Remaining ones of the collection bins include front curvilinear walls separated by the receiving aperture and concentrically spaced thereabout. The remaining collection bins further include a pair of opposed side walls effectively surrounding the receiving aperture.

The one collection bin and the remaining collection bins are vertically adaptable along a longitudinal length of the bucket. Each of the collection bins has a top surface linearly oriented with an upper surface of the bucket. Selected side walls of the remaining collection bins are aligned adjacently with each other in such a manner as to define the receiving aperture in a center of the bucket. The one collection bin is removably received medially of the remaining collection bins. Each of the collection bins further includes at least one tab embedded with respective upper surfaces thereof. Each of the at least one tabs projects tangentially outward from a corresponding rear wall thereof and has a hole drilled therein.

The collection bins are slidably removable and insertable into the bucket. Each of the collection bins further includes a twine tethered to the respective hole thereof, which is critical for lifting the collection bins from the bucket. The bucket is provided with a plurality of slots formed along an interior wall thereof. Each of the collection bins is slidably positional along the slots for securely resting within the bucket. The bucket and each of the collection bins are provided with a plurality of drain holes formed along corresponding bottom surfaces thereof. The bucket and each of the collection bins includes corresponding drain plugs removably embedded within the drain holes, which is vital for assisting a user to easily remove the residual fluids collected therein respectively.

The apparatus further includes a mechanism for removing the collection bins from the bucket, which is critical such that the residual fluid stored within each of the collection bins remains effectively isolated while being discarded from the bucket.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 funnel organizer and drainage system for mechanics
20 lid
25 octagonal aperture
30 reinforced ring
50 bucket
51 handle
60 collection bin
61 side wall
62 front wall
63 rear wall
64 central collection bin
65 receiving aperture
70 tab
75 drilled hole
100 funnel
105 interior threads
110 exterior threads
120 twine
130 drain hole
135 drain plug
140 spacer

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method that discloses an environmentally safe storage and organization of multiple funnels 100, especially, but not limited to, those funnels 100 conventionally used in servicing motor vehicles. Examples of fluids serviced in motor vehicles are anti-freeze, transmission fluid, crankcase oil, brake fluid, or other fluids. The funnel organizer and drainage system for mechanics (herein described as the "apparatus") 10 comprises a lid 20 designed to operably receive a plurality of funnels 100 of various sizes and shapes, interior collection bins 60, 64 for receiving and collection of residual fluid therefrom said funnels 100, and means for removing said interior collection bins 60, 64. The apparatus 10 is envisioned to be fabricated of suitable plastics such as polyethylene, polypropylene, polyurethane, or polystyrene in an injection molding process with octagonal apertures 25 molded therein or drilled, cut, or incised thereafter.

Figure 1:
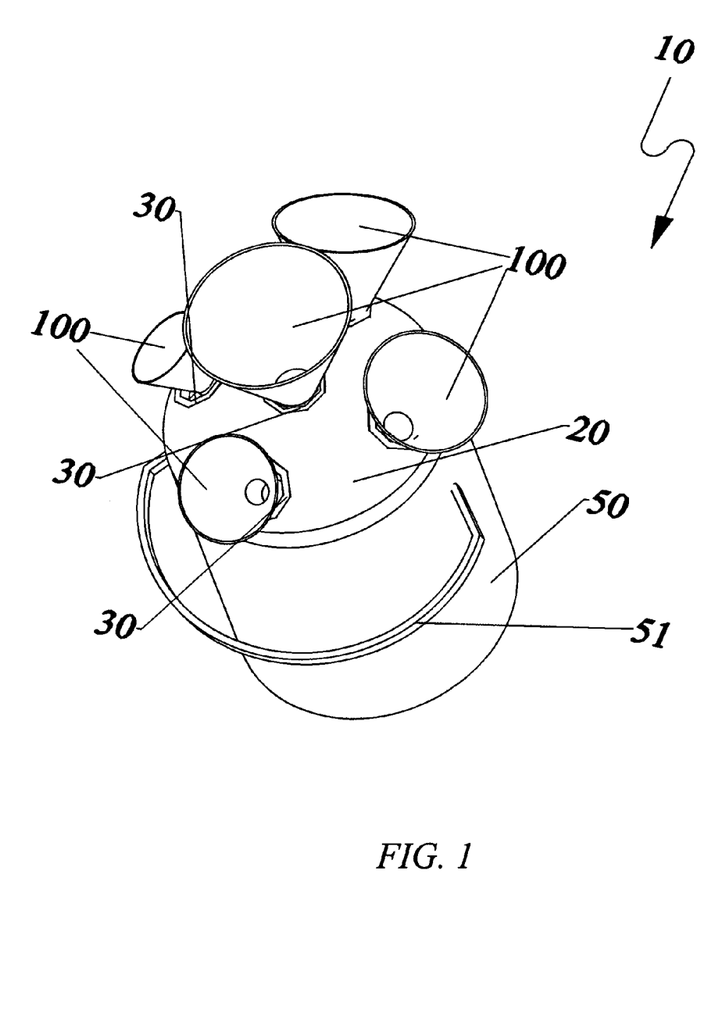
FIG. 1 is a perspective view of a funnel organizer and drainage system for mechanics 10 with a plurality of various shaped funnels 100 inserted therethrough a lid 20, according to the preferred embodiment of the present invention.
Figure 2A:
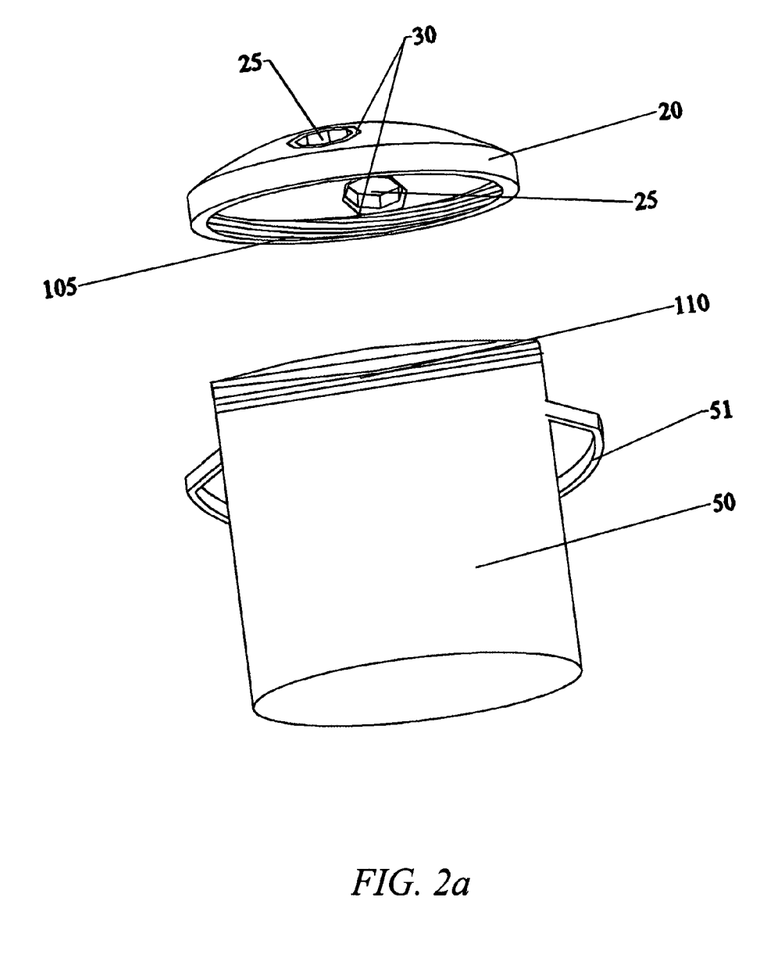
FIG. 2a is a bottom perspective view of the funnel organizer and drainage system for mechanics 10 with a removable lid 20, according to the preferred embodiment of the present invention.
Figure 2B:
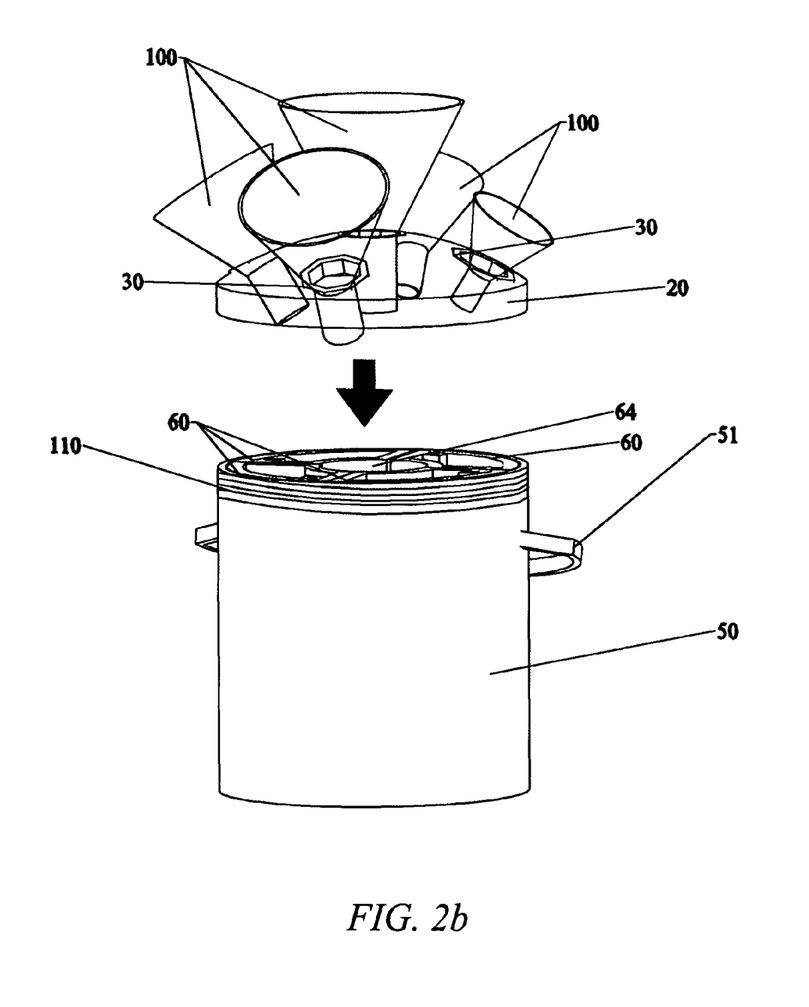
FIG. 2b is a side view of the funnel organizer and drainage system for mechanics 10 with a removable lid 20 with various shaped funnels 100 therein, according to the preferred embodiment of the present invention.

Referring now to FIGS. 1, 2a and 2b, perspective views of the apparatus 10 according to the preferred embodiment of the present invention, is disclosed. The apparatus 10 is comprised of a movably attachable lid 20 preferably with five (5) octagonal apertures 25 having the same size punctured therewithin for collectively receiving funnels 100 of various shapes and sizes. The lid 20 is envisioned to comprise an inner wall having an extruding member extending perpendicular therefrom to adaptably and correspondingly match the outer wall of a five (5) gallon bucket 50, thereby snapping the lid 20 into place. Alternatively, the lid 20 may comprise a inside wall comprising interior threads 105 defining a bore for correspondingly receiving the outer wall of a five (5) gallon bucket 50 defining a grooved region or comprising exterior threads positioned at the upper opening for receiving and cooperating with the inside wall of the lid 20 for secure placement. The lid 20 engages the threaded region thereby disposing the bucket's 50 upper opening of the bucket 50 in the bore. However, other fastening means may be utilized as adequate securement of the lid 20 thereon the bucket 50. A handle 51 is affixed thereto an outer surface of said bucket 50.

The apertures 25 are envisioned to be shaped in an octagonal formation thus to stably hold funnels 100 of a variety of shapes and sizes in an arrangement where they are easily removed. The octagonal apertures 25 are envisioned to be located at the center of the lid 20, and at the twelve (12), three (3), six (6), and nine (9) o'clock positions or in other selected positions depending on the size of the octagonal apertures 25, size of the lid 20, the personal preference of the user, and/or other factors. The octagonal apertures 25 are substantially identical in size, preferably having an inscribed inner diameter of one and a half (1½) to two (2) inches, and shaped to correspond with each other, although it will be understood that the apertures 25 could be formed of sizes and/or shapes that are substantially different. The periphery of said octagonal apertures 25 is envisioned to be reinforced with a thick plastic ring 30 embedded around said periphery substantially in the similar shape as the apertures 25.

Various shaped funnels 100, having a relatively wide upwardly opening upper end for and a narrower downwardly opening lower end, may be placed in the octagonal apertures 25 respectively such that the outer periphery of said apertures 25 or the reinforced ring 30 would support the conical upper end of the funnels 100 such that said funnels 100 would be held in a vertical position in order to drain any residual fluid into the bucket 50 and thus preventing residual fluids from being spilled on work surfaces or floors. Quart bottles or other bottles possessing mechanic fluids, oil, for example, may be placed in the various octagonal apertures 25 to assure draining of the mechanic fluids.

Figure 3:
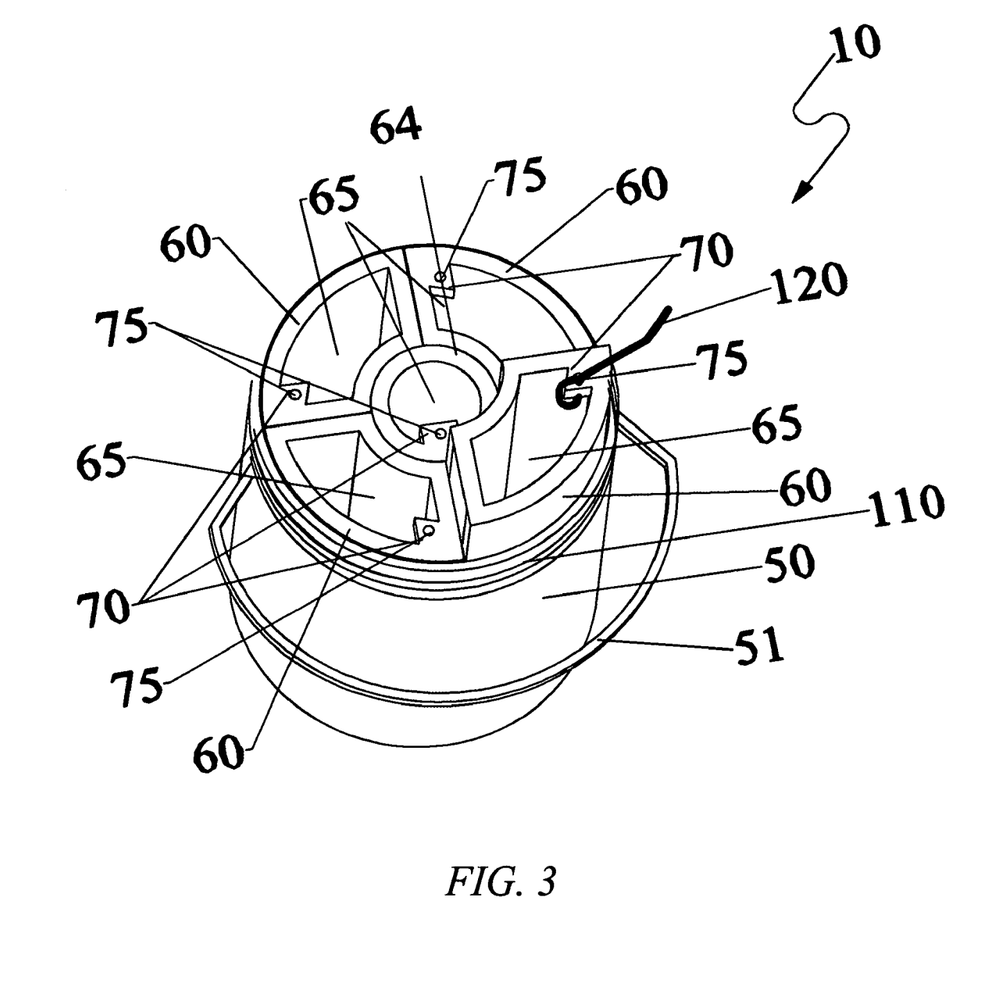
FIG. 3 is an interior perspective view of the funnel organizer and drainage system for mechanics 10, according to the preferred embodiment of the present invention.
Figure 4A:
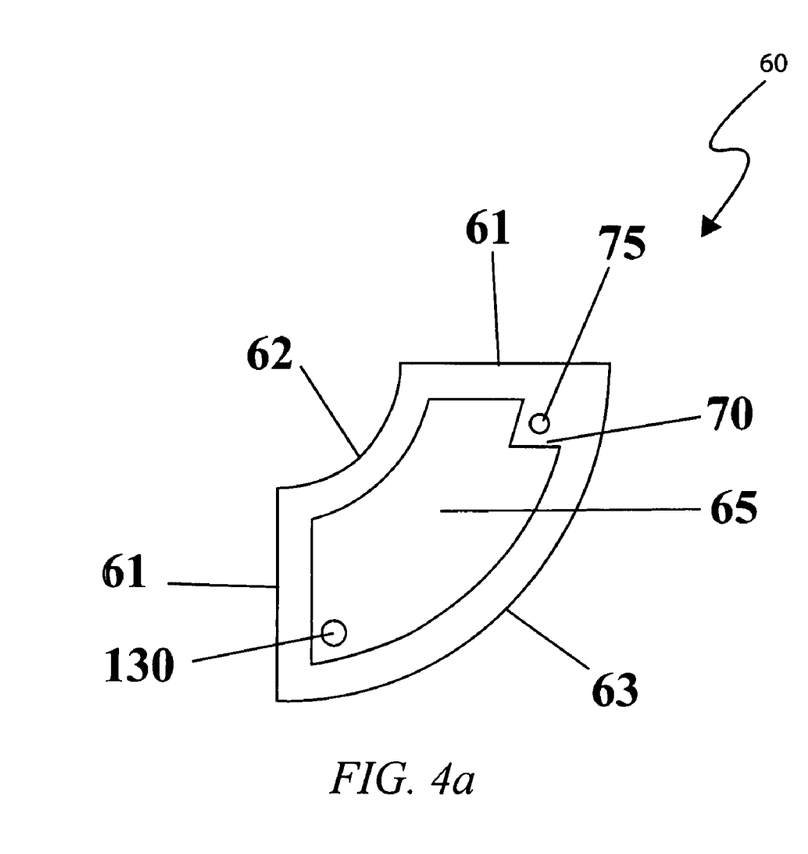
FIG. 4a is a top view of the collection bin 60, according to the preferred embodiment of the present invention.
Figure 4B:
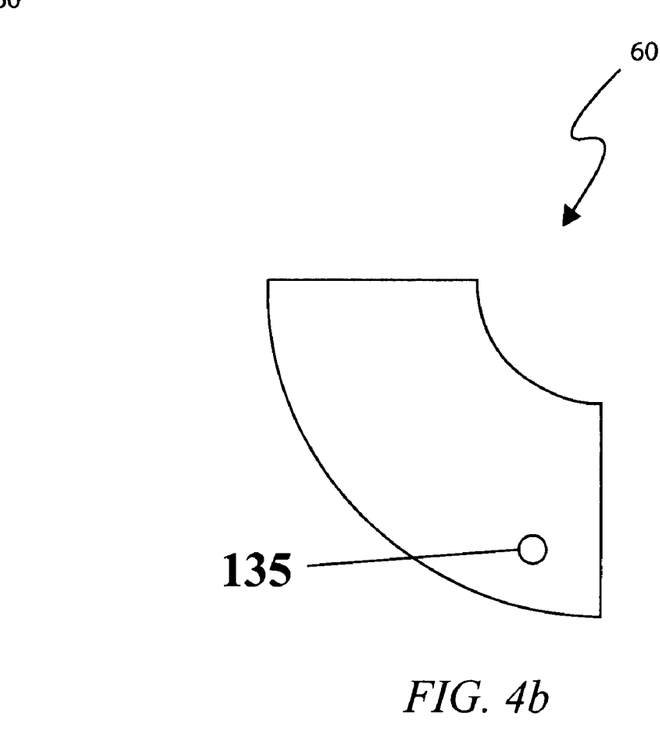
FIG. 4b is a bottom view of the collection bin 60, according to the preferred embodiment of the present invention.
Figure 5:
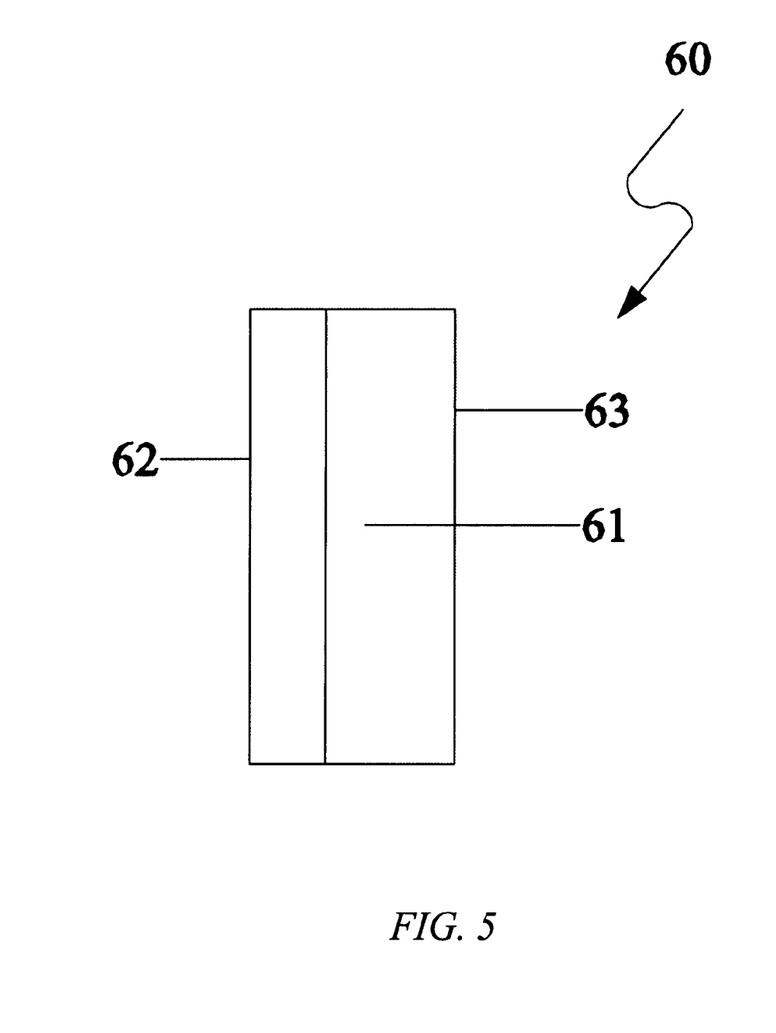
FIG. 5 is a side view of the collection bin 60, according to the preferred embodiment of the present invention.
Figure 6A:
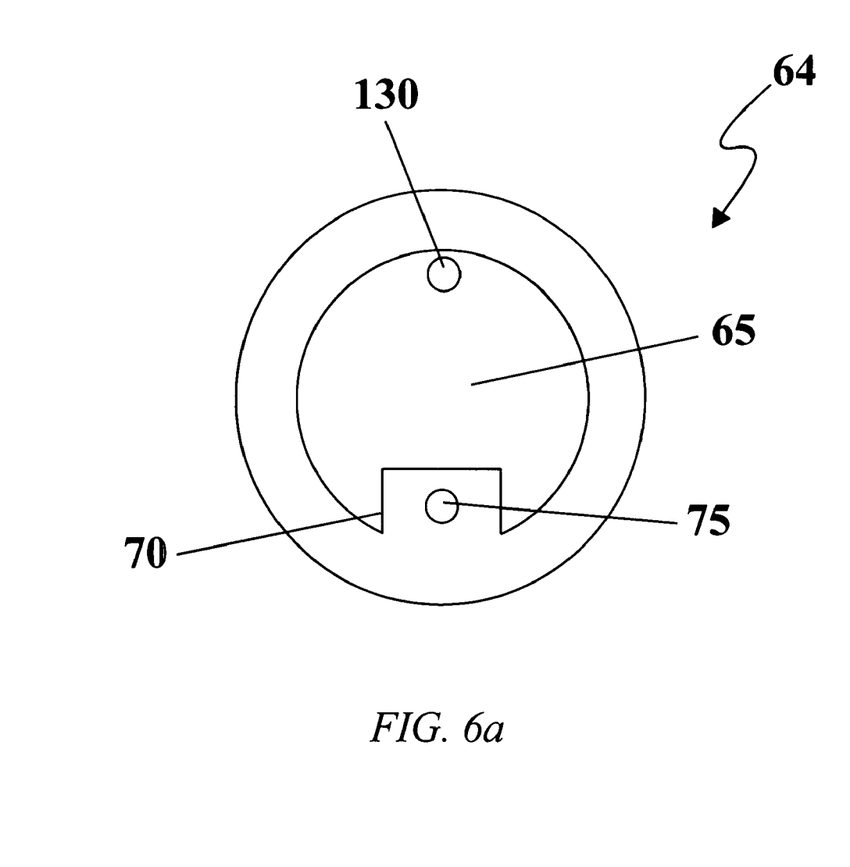
FIG. 6a is a top view of a central collection bin 60, according to the preferred embodiment of the present invention.
Figure 6B:
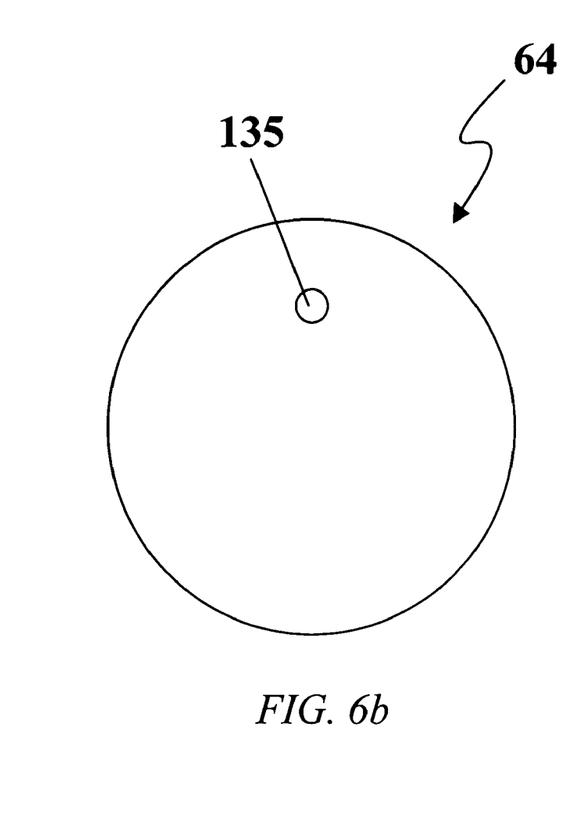
FIG. 6b is a bottom view of a central collection bin 60, according to the preferred embodiment of the present invention.
Figure 7:
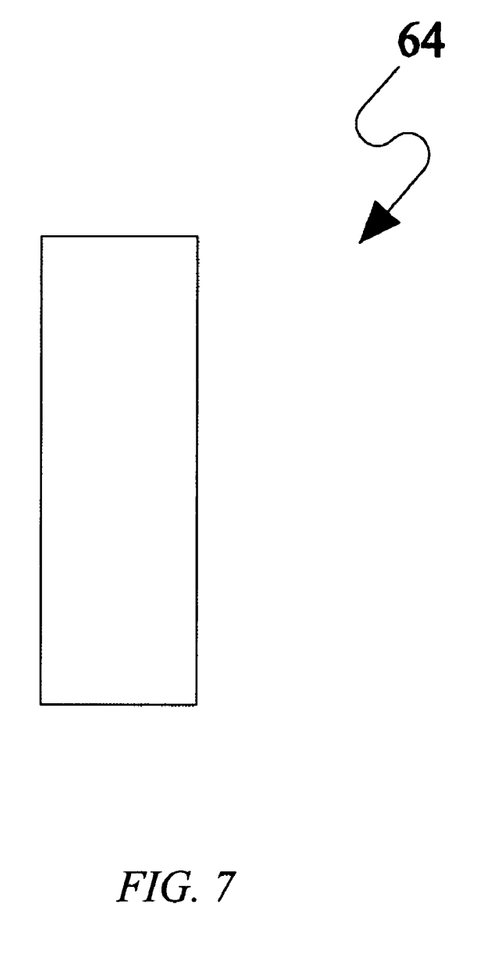
FIG. 7 is a side view of the central collection bin 64, according to the preferred embodiment of the present invention.

Referring now to FIG. 3, an interior perspective view of the apparatus 10 according to the preferred embodiment of the present invention, is disclosed. The apparatus 10 is envisioned to comprise of five (5) collection bins 60, 64 to be inserted therewithin the five (5) gallon bucket 50 for positioning underneath the desired octagonal apertures 25 for operably receiving the residual fluids therefrom the funnels 100 being utilized. Four (4) of the five collection bins 60 are comparably equal in size comprising a front 62 and rear 63 wall being curvilinear separated by a receiving aperture 65 of the collection bin 60 with a pair of opposite side walls 61 surrounding said receiving aperture 65 which, in conjunction with the front 62, rear 63, and bottom (not shown) wall, define the collection bins 60 extending from the upper end of the structure to its lower end. The collection bin 60, 64 can then be moved down (lowered or dropped) so that the receiving aperture 65 is facing upward with the bottom wall adjacent to the bottom wall of the bucket 50. The collection bins 60, 64 may be empty or may contain a layer of a granular adsorbent material.

Referring now to FIGS. 4a through 9, top, side, and bottom views of the collection bins 60, 64 according to the preferred embodiment of the present invention, are disclosed.

A rope, twine, wire, string, cord, or other lines 120 may be tied, fixed, coupled, or other removably attachable means therethrough the tab 70 by removably attaching said line therethrough the hole 75. Said line 120 may be manipulated to lift the desired collection bin 60, 64 thereout of the bucket 50.

Further, the collection bins 60, 64 are envisioned to be introduced in a plurality of colors, comprising stickers, and/or comprising decorative motifs to match the corresponding plastic ring 30 surrounding each octagonal periphery on the lid 20. This color-coded system will designate which collection bin 60, 64 will be removably and slidably inserted therein a common five (5) gallon bucket 50 under the corresponding octagonal aperture 25 for receiving the residual fluids descending therefrom the designated funnel 100. The system aids in the process of keeping the fluids from being cross contaminated and the wrong funnel 100 being inserted in the wrong octagonal aperture 25. The stickers could exhibit the exact substance or a blank sticker for insertion of data by user.

Figure 8:
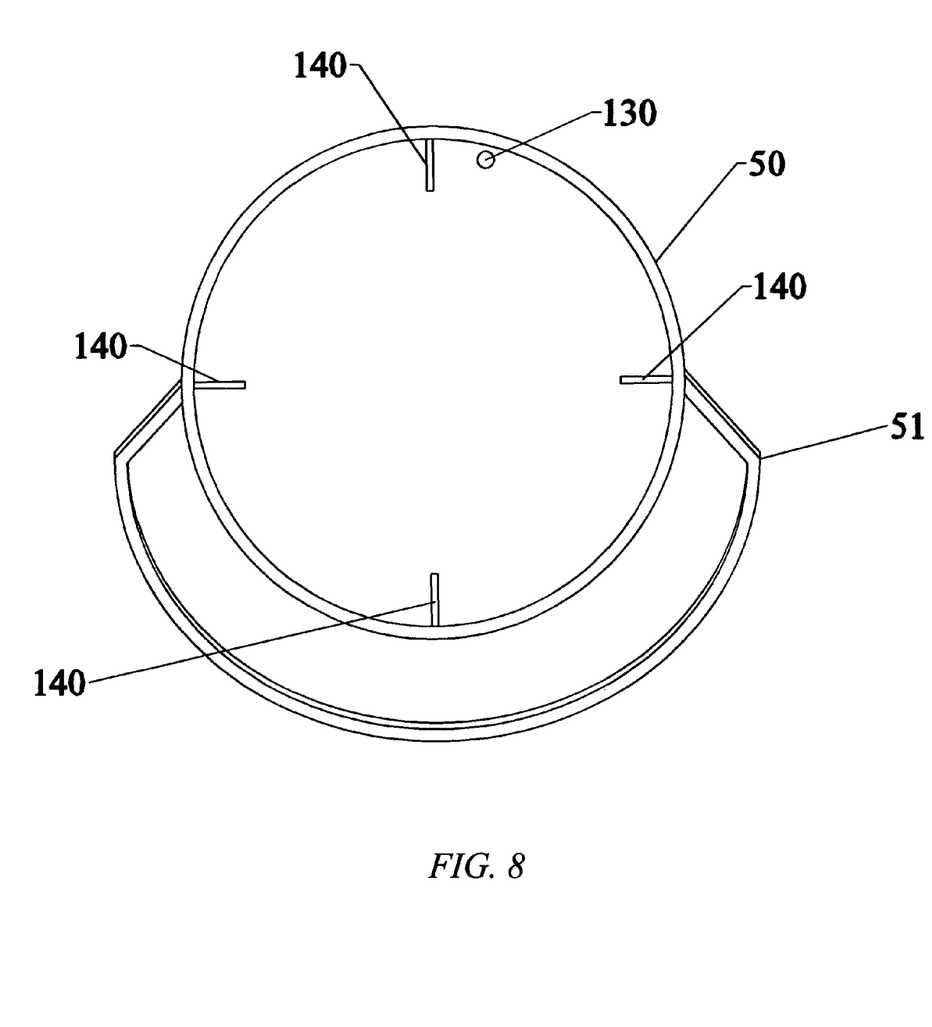
FIG. 8 is a top view of the bucket 50, showing the spacers 140 molded therein, according to the preferred embodiment of the present invention; and, FIG. 9 is a bottom view of the bucket 50, according to the preferred embodiment of the present invention.
Figure 9:
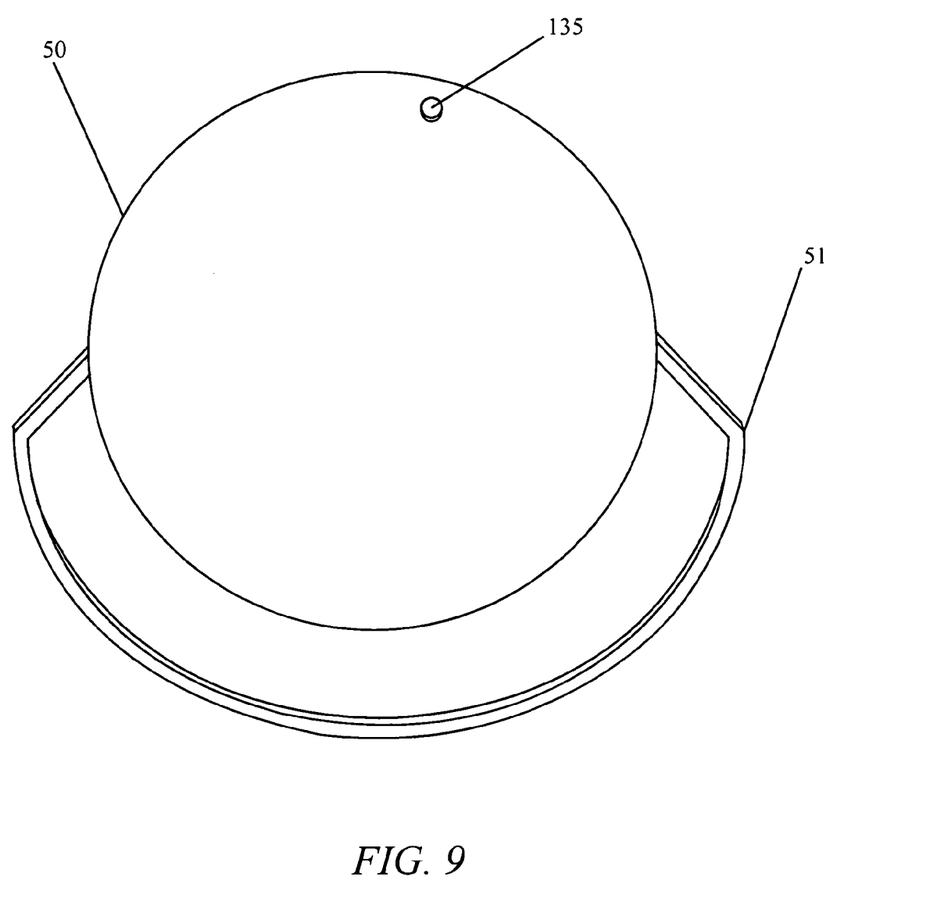

An alternate embodiment of the present invention 10 comprises means for the collection bins 60, 64 to reside within plurality of buckets 50 of various sizes and shapes, such as a plurality of equidistantly-spaced spacers 140 affixed or integral thereto said bucket 50. The particular shape of the apparatus 10 can be varied; for instance, the collection bins 60, 64 may be introduced as a plurality of shapes in sizes with respects thereto a desired bucket 50.

Another alternate embodiment of the present invention 10 may disclose a bucket 50 comprising interior collection bins 60, 64 which may be removably or permanently inserted therewithin. The removably interior collection bins 60, 64 may reside within interior walls or slots subdividing the desired bucket 50 thereby aligning said interior wall with the wall of the removably interior compartments so that said walls are adjacent.

Yet another alternate embodiment of the present invention 10 may disclose a means for the safe storage and organization of multiple fluids such as, but not limited to, cleaning fluids (e.g. dishwashing soap, Lysol™, etc), water, hand soap, and/or other desirable liquids. Alternatively, the apparatus 10 may be utilized to store solidified objects such as, but not limited to, washers, nuts, bolts, and/or or other objects.

Still yet another alternate embodiment of the present invention 10 may disclose drain holes 130 with corresponding drain plugs 135 embedded thereto the bottom surface of the bucket 50 and/or collection bins 60, 64 for the easy removal of the residual fluids residing therewithin.

The preferred embodiment of the present invention can be utilized by the common user in a simple and effortless manner with little or no training. After initial purchase or acquisition of the funnel organizer and drainage system for mechanics 10, it would be configured as indicated in FIGS. 1 through 3.

The method of utilizing the device may be achieved by performing the following steps: inserting each collection bin 60, 64 separately in an unspecified order by having one (1) or more fingers on the bottom surface of the tab 70, or alternately having a line 120 tied thereto the tab 70 via drilled hole 75, and lowering the collection bins 60, 64 therein a desired five (5) gallon bucket 50 so that the receiving aperture 65 is facing upward with the bottom wall adjacent to the bottom wall of the bucket 50; snapping or twisting the lid 20 thereon the bucket 50 correspondingly matching the color, sticker, and/or other motif of the reinforced ring 30 therewith the color, sticker, and/or other motif of the collection bin 60, 64; inserting desired funnels 100 therein the desired octagonal apertures 25; pouring the fluid substance therethrough the funnels 100 to be collected in the corresponding collection bins 60, 64 residing underneath said octagonal apertures 25; removing the lid 20 off of the bucket 50 by snapping or twisting off; removing the according collection bins 60, 64 separately by having one (1) or more fingers on the bottom surface of the tab 70, or alternately having a line 120 tied thereto the tab 70 via drilled hole 75, and raising the collection bins 60, 64 thereout the bucket 50; environmentally and safely disposing the residual fluid contents therein the collection bins 60, 64; and, cleaning the collection bins 60, 64, if desirable.

The apparatus 10 discloses a device for an environmentally safe storage and organization of multiple funnels 100, especially, but not limited to, those funnels 100 conventionally used in servicing motor vehicles. The octagonal apertures 25 are arranged within the lid 20 at five (5) locations along the outer edges and center of said lid 20 and shaped for the easy removal of the funnels 100. After use, the remaining fluids in the funnels 100 are allowed to gravity drip and collect in the collection bins 60, 64, consequently the sealed bucket 50, for reduction of messes and spills. Gravity and time is utilized to completely drain the liquids therefrom the funnels 100 to be later collected in the collection bins 60, 64. The collection bins 60, 64 can be properly emptied after the collection of fluids by environmentally safe disposal means. The reclaimed fluids may be reused, recycled, or disposed of safely and properly.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A combined funnel organizer and drainage system comprising:
    a bucket having an upper opening;
    a lid designed in such a manner to operably receive a plurality of funnels therein, said lid being removably attached to said bucket and being provided with a plurality of coextensively shaped apertures punctured therein for collectively receiving the funnels and maintaining the funnels at substantially stable positions during storage, wherein said apertures are octagonally shaped to stably hold a variety of the funnels in an arrangement where the funnels are easily removable from said lid, each of said octagonal apertures being provided with a plastic ring embedded around a periphery thereof respectively, said rings having substantially similar shapes as the apertures respectively;
    a plurality of isolated collection bins for receiving and collecting residual fluid dripping from the funnels; and,
    means for removing said collection bins from said bucket such that the residual fluid stored within each of said collection bins remains isolated while being discarded from said bucket.

2. The combined funnel organizer and drainage system of claim 1, wherein said lid comprises:
    an inner wall having an extruding member extending perpendicular therefrom to adaptably and correspondingly match an outer wall of said bucket.

3. The combined funnel organizer and drainage system of claim 1, wherein said lid comprises:
    a threaded inside wall defining a bore for correspondingly receiving an outer wall of said bucket, said outer wall having a threaded region positioned at an upper opening thereof for receiving and cooperating with said inside wall of said lid in such a manner that said lid is securely positioned over said upper opening.

4. The combined funnel organizer and drainage system of claim 1, wherein said collection bins are removably seated within said bucket and positioned underneath desired ones of said apertures for operably receiving the residual fluids from the funnels, one of said collection bin having a receiving aperture centrally registered with said bucket, remaining ones of said collection bins including front curvilinear walls separated by said receiving aperture and concentrically spaced thereabout, said remaining collection bins further include a pair of opposed side walls surrounding said receiving aperture, wherein said one collection bin and said remaining collection bins are vertically adaptable along a longitudinal length of said bucket.

5. The combined funnel organizer and drainage system of claim 4, wherein each of said collection bins has a top surface linearly oriented with an upper surface of said bucket, selected side walls of said remaining collection bins are aligned adjacently with each other in such a manner to define said receiving aperture in a center of said bucket, said one collection bin being removably received medially of said remaining collection bins.

6. The combined funnel organizer and drainage system of claim 5, wherein each of said collection bins further comprises:

at least one tab embedded with respective upper surfaces thereof, each of said at least one tabs projecting tangentially outward from a corresponding rear wall thereof and having a hole drilled therein, said collection bins being slidably removable and insertable into said bucket, each of said collection bins further including a twine tethered to said respective hole thereof for lifting said collection bins from said bucket, said bucket being provided with a plurality of slots formed along an interior wall thereof, each of said collection bins being slidably positional along said slots for securely resting within said bucket.

7. The combined funnel organizer and drainage system of claim 1, wherein said bucket and each of said collection bins are provided with a plurality of drain holes formed along corresponding bottom surfaces thereof, said bucket and each of said collection bins including corresponding drain plugs removably embedded within said drain holes for assisting a user to easily remove the residual fluids collected therein respectively.

8. A method for storing a plurality of funnels and collecting residual fluids dispensed therefrom, said method including the steps of:
   a. randomly and separately inserting a plurality of collection bins into a bucket such that a receiving aperture faces upward, said receiving aperture having a bottom wall positioned adjacent to a bottom wall of said bucket;
   b. positioning a lid on the bucket;
   c. attaching a plurality of reinforcement rings to a plurality of apertures formed within said lid, each of said reinforcement rings having a unique identification marker associated with a corresponding one of said collection bins respectively;
   d. inserting at least one funnel into said at least one aperture of said lid;
   e. pouring a variety of residual fluids into the funnels such that the residual fluids are collected in corresponding ones of said collection bins residing underneath said apertures of said lid and said residual fluids may be reused, recycled, or disposed of at a later time;
   f. removing said lid from said bucket;
   g. removing selected ones of said collection bins from said bucket;
   h. environmentally and safely disposing the residual fluids from said collection bins if desired; and,
   j. cleaning the collection bins as needed.

9. The method of claim 8, wherein step g. further includes the step of:
   a. removing at least one finger attached to a bottom surface of a tab that is attached to a selected one of said collection bins.

10. The method of claim 8, wherein step g. further includes the step of:
   a. tying a line to a tab that is attached to said a selected one of said collection bins via a drilled hole formed within said tab.

* * * * *